United States Patent
Umakandan et al.

(10) Patent No.: US 12,033,009 B2
(45) Date of Patent: Jul. 9, 2024

(54) SOFTWARE ORCHESTRATION FRAMEWORK FOR IMPLEMENTING APPLICATION PROGRAMMING INTERFACES

(71) Applicant: PAYPAL, INC., San Jose, CA (US)

(72) Inventors: Senthil Umakandan, Chennai (IN); Sharmila Radhakrishnan, Chennai (IN)

(73) Assignee: PayPal, Inc., San Jose, CA (US)

(*) Notice: Subject to any disclaimer, the term of this patent is extended or adjusted under 35 U.S.C. 154(b) by 305 days.

(21) Appl. No.: 17/493,514

(22) Filed: Oct. 4, 2021

(65) Prior Publication Data

US 2023/0107397 A1  Apr. 6, 2023

(51) Int. Cl.
G06F 9/54 (2006.01)

(52) U.S. Cl.
CPC .................... G06F 9/547 (2013.01)

(58) Field of Classification Search
CPC ................. G06F 9/541; G06F 9/547
See application file for complete search history.

(56) References Cited

U.S. PATENT DOCUMENTS

| | | | | |
|---|---|---|---|---|
| 8,516,504 | B1* | 8/2013 | Park | G06F 8/427 717/140 |
| 11,483,317 | B1* | 10/2022 | Bolignano | G06F 21/577 |
| 11,494,246 | B1* | 11/2022 | Adams | H04L 63/08 |
| 2006/0155720 | A1* | 7/2006 | Feinberg | G06F 16/972 |
| 2020/0167172 | A1* | 5/2020 | Rajasekar | G06F 9/541 |
| 2021/0112088 | A1* | 4/2021 | Ramasamy | H04L 63/1433 |
| 2023/0012305 | A1* | 1/2023 | Bhargava | H04L 41/5006 |

* cited by examiner

*Primary Examiner* — Brian W Wathen
(74) *Attorney, Agent, or Firm* — Haynes and Boone, LLP (57) ABSTRACT

Methods and systems are presented for facilitating development and execution of application programming interfaces (APIs) using a software orchestration framework. Using the software orchestration framework, APIs may be developed using declarative statements only, without requiring any implementation using programming code. Based on parsing and interpreting the declarative statements at runtime, computer processing logic for the API can be determined dynamically. The computer processing logic may include instructions for validating input values included in a corresponding API call and a set of services to be executed for the API. Since the software orchestration framework can dynamically determine and execute the computer programming logic based on the declarative statements corresponding to the API, the business logic associated with an API can be dynamically modified without requiring recompiling and/or re-deploying of the software orchestration framework.

20 Claims, 7 Drawing Sheets

```
{
  "conversationById": {
    "api_codegen_metadata" : {"package": "com.paypal.cs.frontoffice" ...}
    "authorization": {...}
    "request" :
      {
        "name": "conversation_id",
        "in": "path",
        "description": "The id of the FAQ requested.",
        "required": true
      },
      {
        "name": "entry_id",
        "type": "string",
        "description": "The customer_id of the chat conversation – encrypted account number.",
        "in": "query",
        "minLength": 1,
        "maxLength": 64,
        "pattern": "^[0-9a-zA-Z]*$",
        "required": true
      }
      • • •

"response" :{"data_type": "object"...}
}
```

Figure 3

```
{
  "conversationById": {
    "api_codegen_metadata": {"package": "com.paypal.cs.frontoffice" ...}
    "authorization": {...}
    "request": {...}
    "response": {
      "data_type": "object",
      "stub_enabled": false,
      "stub-mode": "static",
      "service_orchestration": [{
        "dependent_services": [{
          "service": "csconversationmgmtserv_load_conversation_by_id"
        }],
        "properties": [
          {
            "field_name": "conversation_id",
            "field_type": "string",
            "data_path": "csconversationmgmtserv_load_conversation-by-id.$['id']"
          },
          {
            "field_name": "status",
            "field_type": "string",
            "data_path": "csconversationmgmtserv_load_conversation-by-id.$['status']"
          },
          •••
        ]
      }]
    }
  }
}
```

SOFTWARE ORCHESTRATION FRAMEWORK FOR IMPLEMENTING APPLICATION PROGRAMMING INTERFACES

BACKGROUND

The present specification generally relates to software development frameworks, and more specifically, to providing a software orchestration framework for implementing and executing application programming interfaces according to various embodiments of the disclosure.

RELATED ART

Application programming interfaces (APIs) have been widely used by computer software developers as part of a computer software architecture for providing computing services among computer software modules. For example, a set of APIs may be developed to implement a set of backend services for an organization. The set of APIs may include an API for retrieving specific data from a database, an API for processing a particular transaction, an API for editing a record in a database, and possibly other APIs that implement specific functionalities for the organization. By making API calls, other software modules (e.g., webpages, mobile application interfaces, etc.) may access the set of backend services based on the implementations of the set of APIs.

Conventionally, the development of APIs can only be performed by skilled software programmers who have deep knowledge and understanding of programming languages and software architecture due to the complications required for implementing APIs. However, since many of the backend services correspond to business logic that may be dictated by business processes of the organization, disconnects often exist between what the business personnel (e.g., product managers, business development team members, etc.) who specify the business logic and the software programmers who implement the business logic. Furthermore, due to constant changes in the organization, the business logic associated with the backend services may change frequently, which increases the complexity of building and deploying the APIs. Thus, there is a need for providing a software orchestration framework that enables simple implementations and execution of APIs.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure includes methods and systems for facilitating development and execution of application programming interfaces (APIs) (also referred to as "API functions") using a software orchestration framework. Using the software orchestration framework, APIs may be developed without requiring any implementation using programming code. Instead, declarative statements may be used to specify the business logic corresponding to a backend service of an organization. In some embodiments, in response to receiving a corresponding API call, the software orchestration framework may dynamically determine and execute computer programming logic based on the declarative statements corresponding to the API. This way, the business logic associated with an API may be dynamically modified without requiring recompiling and/or re-deploying any computer software programs.

An API is a connection between computer devices and/or computer programs. In some embodiments, it can be implemented as a computer software function (e.g., a software program) that can be accessed by another computer module (e.g., another computer program, etc.) via an API call. As such, each API may include a corresponding interface, which specifies a name and a manner in which an API call corresponding to the API can be made. For example, the interface may specify a number and attributes of input parameters (e.g., an order, data types, etc.) required for making the API call. An example API interface for an API that assesses a risk of a transaction may appear as the following:

int transaction_risk(int sender_account_id, int recipient_account_id, float amount)

In this example, the other computer module may make an API call for this API using a programming statement that includes the name of the API interface (e.g., "transaction_risk") and values corresponding to all of the input parameters required by the API as specified in the API interface. An example API call may appear as the following:

int risk_value=transaction_risk(3224, 4532, 54.99);

In this example, the first number "3224" corresponds to an identifier of a sender account, the second number "4532" corresponds to an identifier of a recipient account, and the third number "54.99" corresponds to an amount of the transaction.

The API may also include a computer programming logic for implementing the API. The computer programming logic, which may include one or more sequences of programming instructions, may be executed by a computer system when the corresponding API call is made. The computer programming logic may correspond to a backend service provided by the organization, and may be implemented using a particular programming language (e.g., Java, C++, Python, etc.) that can be compiled and built (and/or interpreted) into executable code, which may then be executed by a computer system. Thus, when a computer module makes the API call, the executable code may be executed by the computer system to perform the computer programming logic corresponding to the backend service for the computer module.

As discussed herein, APIs are traditionally developed by skilled computer software programmers due to the use of complex programming languages (e.g., object-oriented languages, etc.) and computer software architecture. However, since many of the APIs are used by organizations to implement backend logic that can be dictated by the organizations' business needs, the requirements for the backend logic are often specified by business personnel who may not have the computer skills and knowledge to implement the APIs in the conventional manner.

Thus, according to various embodiments of the disclosure, a software orchestration framework may be provided to enable implementations of APIs using declarative statements and without requiring the use of programming languages. In some embodiments, the software orchestration framework may specify a format in which the business logic corresponding to an API can be specified via one or more declarative statements. The format may include a first declarative statement related to the interface of the API, a second declarative statement related to required access level of the client device when the API call is made, a third declarative statement related to handling and verification of input parameters, and a fourth declarative statement related to generating a response to the API call. In some embodiments, the declarative statements of the different sections can be stored in a file (e.g., a text file) that can be subsequently parsed and interpreted by the software orchestration framework.

Declarative statements, unlike programming code, do not include any computer programming logic. Each declarative statement may include one or more key-value pairs, and each key-value pair specifies (also referred to as "declares") a value for a corresponding key. In some embodiments, each declarative statement may include only a declared value, where the corresponding attribute is either implied based on a formatting of the file that includes the declarative statements or based on the values themselves. Thus, a person who implements an API using the declarative statements need not have knowledge or understanding of any programming language or computer software architecture, but may implement an API by providing various key-value pairs. The declarative statements corresponding to an API may be stored within an API declaration file (e.g., a text file). Additional APIs may be implemented in the similar manner. As such, one or more API declaration files may be generated and stored in a computer storage accessible by the software orchestration framework.

In some embodiments, the software orchestration framework may include a code generation module configured to generate programming code for one or more APIs based on the declarative statements before the APIs are compiled and deployed (or interpreted). For example, the code generation module may automatically generate programming code corresponding to a public interface of an API based on the first declarative statement related to the interface of the API. The programming code generated by the code generation module based on the first declarative statement may include only a structure of the public interface (e.g., a name, a list of required input parameters, a default error handling logic, etc.), but may not include any computer programming logic for implementing the API. The public interface may also include a reference to the API declaration file corresponding to the API. The programming code corresponding to the public interface of the API may be incorporated into an API handler module of the software orchestration framework. After generating the public interface of the API, the API handler module may be compiled (or interpreted) into machine executable code, which may then be deployed in a computer system such that other computer modules may access one or more APIs included in the API handler module.

When an API call is received (e.g., another computer module makes an API call), the API handler module may determine an API corresponding to the API call, and may access the API declaration files stored in the computer storage. The API handler module may determine an API declaration file that implements the API corresponding to the API call. The API handler module may parse the declaration statements included in the API declaration file to determine a computer programming logic for the API. The API handler module may then perform the computer programming logic for the API call. In some embodiments, the API handler module may be configured to perform the computer programming logic in a non-blocking manner, such that a failure or a suspension for performing the computer programming logic associated with the API would not cause failure or suspension to the API handler module. This way, even though the execution of one API fails, the API handler module can still function properly and execute other APIs in response to other API calls.

In some embodiments, the API handler module may generate a response based on performing the computer programming logic. For example, if the API is for retrieving data from a data storage, the response may include the data retrieved from the data storage. In another example, if the API is for assessing a risk of a transaction, the response may include data indicating the risk of the transaction. The API handler module may then provide the response to the computer module as a response to the API call.

Since only the programming code corresponding to the public interface of an API is converted into machine executable code before or during compile-time, and the computer programming logic associated with the API is determined dynamically during runtime (e.g., based on parsing the declarative statements of the API declaration file during runtime, which are not converted into machine code), the computer programming logic (that is specified by the declarative statements for handling the input parameters and for generating the response) can be modified without requiring re-compiling and/or re-building the programming code associated with the API handler module. After the declarative statements are modified, the API handler module, in response to a subsequent API call, may determine updated computer programming logic for the API based on the modified declarative statements, and perform the updated computer programming logic accordingly.

Figure 1:
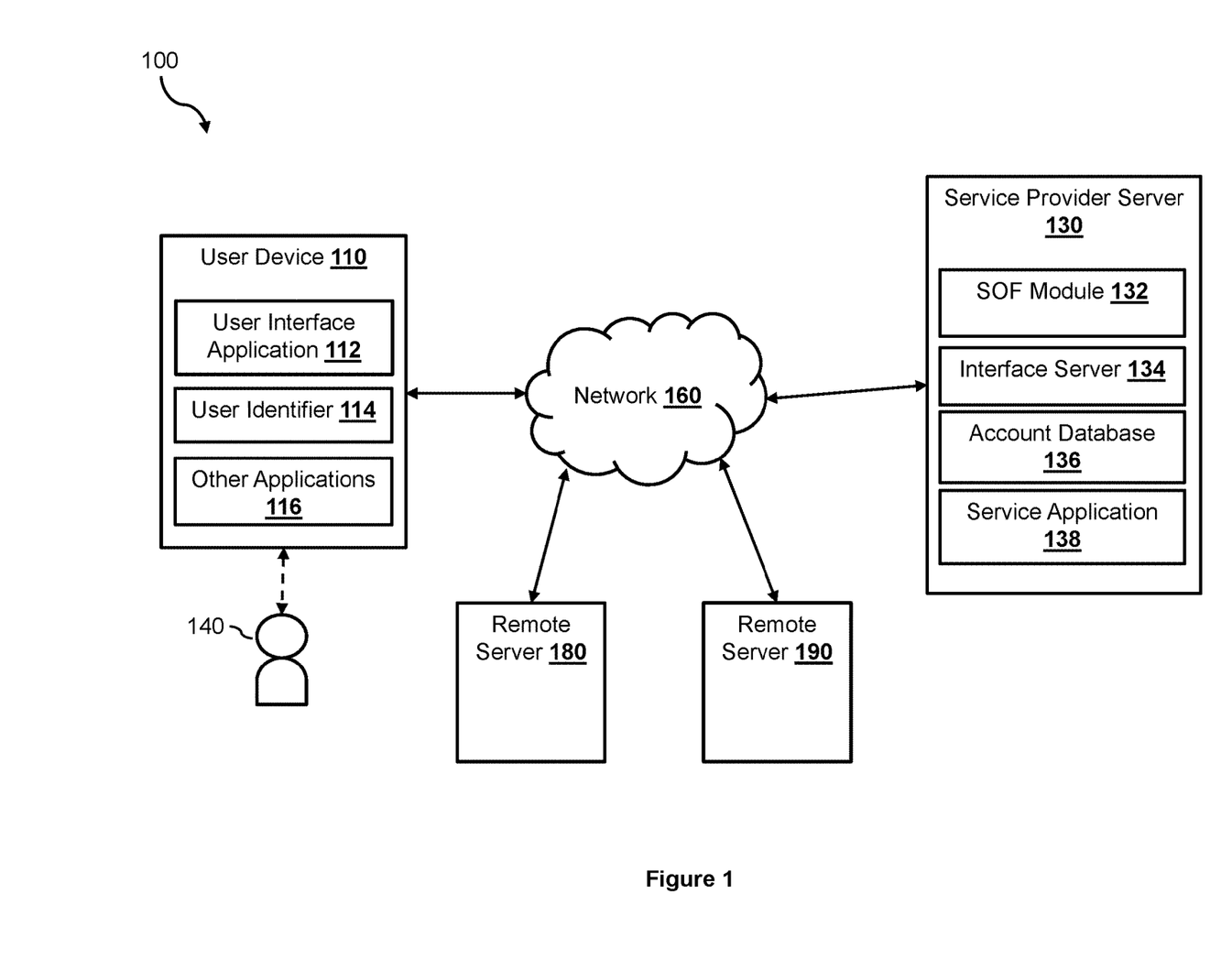
FIG. 1 is a block diagram illustrating a networked system that includes an electronic transaction system according to an embodiment of the present disclosure.

FIG. 1 illustrates a networked system 100, within which the software orchestration framework may be implemented according to one embodiment of the disclosure. Note that the present techniques may be applied in many different computing and technological environments, however, and are not limited to those shown in the figures. The networked system 100 includes a service provider server 130, remote servers 180 and 190, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the service provider server 130 over the network 160. For example, the user 140 may log in to a user account to access account services or conduct electronic transactions (e.g., account transfers or payments, purchasing goods and/or services, etc.) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile application, etc.), which may be utilized by the user 140 to interact with the merchant server 120 and/or the service provider server 130 over the network 160. In one implementation, the user interface application 112 includes a software program (e.g., a mobile application) that provides a graphical user interface (GUI) for the user 140 to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one user identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the user identifier 114 may be passed with a user login request to the service provider server 130 via the network 160, and the user identifier 114 may be used by the service provider server 130 to associate the user 140 with a particular user account, a particular digital wallet, and/or a particular profile.

In various implementations, the user 140 is able to input data and information into an input component (e.g., a keyboard) of the user device 110. For example, the user 140 may use the input component to interact with the UI application 112 (e.g., to retrieve content from third-party servers such as the service provider server 130, etc.).

The service provider server 130, in one embodiment, may be maintained by a transaction processing entity or an online service provider, which may provide processing for electronic transactions between different entities (e.g., between the user 140 of the user device and other users of the online service provider, etc.), between a user and one or more business entities, or other types of payees. As such, the service provider server 130 may include a service application 138, which may be adapted to interact with the user device 110 over the network 160 to facilitate the searching, selection, purchase, payment of items, and/or other services offered by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities (e.g., between two users, etc.). In one implementation, the payment processing application assists with resolving electronic transactions through validation, delivery, and settlement. As such, the payment processing application settles indebtedness between users and/or between a user and a merchant, wherein accounts may be directly and/or automatically debited and/or credited of monetary funds.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various services provided by the service provider server 130. The interface server 134 may also include other electronic pages associated with the different services (e.g., electronic transaction services, etc.) offered by the service provider server 130. As a result, a user (e.g., the user 140, etc.) may access a user account associated with the user and access various services offered by the service provider server 130, by generating HTTP requests directed at the service provider server 130.

The service provider server 130, in one embodiment, may be configured to maintain one or more user accounts in an account database 136, each of which may be associated with a profile and may include account information associated with one or more individual users (e.g., the user 140 associated with user device 110, etc.). The account information may include an identifier of the user account, and other information associated with the user such as a gender, an age, demographic information, device information associated with devices associated with the user (e.g., a device identifier, an Internet Protocol (IP) address of the device, a residential address, an operating system version, screen attributes of the device, etc.). In one implementation, a user may have credentials to authenticate or verify identity with the service provider server 130. Thus, the service provider server may store the credentials of the users in corresponding records of the account database 136 associated with the user accounts. In some embodiments, the account database 136 may also store transaction data associated with transactions that have been conducted by users of the service provider sever 130. The transaction data may include a transaction amount, device information associated with a device used by the user to conduct the transaction, merchant (or payee) information, item purchased, etc.

In various embodiments, the service provider server 130 includes a software orchestration framework (SOF) module 132 that implements the software orchestration framework as discussed herein. In particular, the SOF module 132 may enable users to implement various application programming interfaces (APIs) using declarative statements, without using any programming code. For example, an agent of the service provider server 130 may implement an API by generating declarative statements in an API declaration file. The API declaration file may be stored in a data storage accessible by the SOF module 132, which may be a data storage within the service provider server 130, a local data storage coupled to the service provider server 130, or in remote servers 180 and 190.

Based on a first declarative statement related to an interface for the API, the SOF module 132 may generate programming code associated with a public interface for the API during compile-time. The programming code generated by the SOF module 132 may only include a programming structure for the public interface, and may not include any computer programming logic for implementing the API. The programming code generated for the public interface for the API may be compiled together with other software components of the SOF module 132, to generate executable code for the SOF module 132 that can be deployed and executed by a computer system.

Once the SOF module 132 is deployed, it may receive any API calls made by other computer modules, such as the web server 134. For example, as discussed herein, the web server 134 may host webpages that can be accessed by user devices, such as the user device 110. In some embodiments, some of the webpages may enable users (e.g., the user 140) to access services provided by other modules of the service provider server 130. The services (also referred to as "back-end services") may include retrieving data from a data storage associated with the service provider server 130. In other examples, the services may also include using one or more machine learning models to provide a result (e.g., assessing a risk of a transaction, etc.). Through the SOF module 132, a webpage may access the services via one or more API calls.

When the SOF module 132 receives an API call, the SOF module 132 may access API declaration files accessible by the SOF module 132, which may be stored in a data storage associated with the service provider server 130 or any one of the remote servers 180 and 190. The SOF module 132 may identify, from the API declaration files, a particular API declaration file corresponding to the received API call. The SOF module 132 may parse the declarative statements in the particular API declaration file, and may determine computer programming logic for the API based on the declarative statements in the particular API declaration file.

The SOF module 132 may execute the computer programming logic for the API call. In some embodiments, the SOF module 132 may generate a data based on executing the computer programming logic. Thus, the SOF module 132 may return the data to the webpage as a response to the API call.

Figure 2:
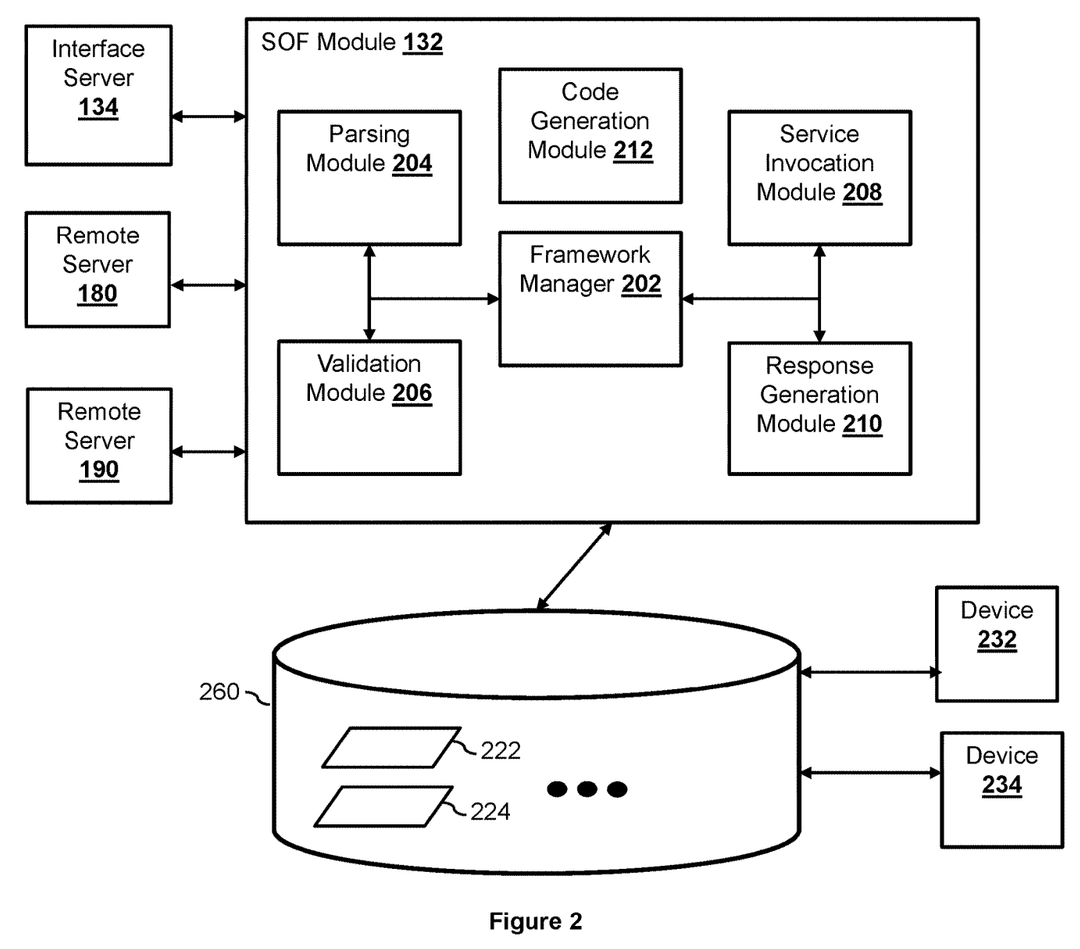
FIG. 2 is a block diagram illustrating a software orchestration framework module according to an embodiment of the present disclosure.

FIG. 2 illustrates a block diagram of the software orchestration framework (SOF) module 132 according to an embodiment of the disclosure. The SOF module 132 includes a framework manager 202, a parsing module 204, a validation module 206, a service invocation module 208, a response generation module 210, and a code generation module 212. In some embodiments, the SOF module 132 is communicatively coupled to a data storage 260, which may be a local storage for the service provider server 130 or a storage associated with the remote servers 180 and/or 190.

In some embodiments, through services provided by the SOF module 132, an agent of the service provider server 130 may implement, via a device such as the device 232 and the device 234, one or more APIs using declarative statements. For example, an agent may generate an API declaration file 222 for implementing a particular API by including one or more declarative statements. The declarative statements may include a first declarative statement related to an interface for the particular API. Thus, the first declarative statement may specify a name for the particular API, input parameter types for one or more input parameters for the particular API, and a location (e.g., a path, a network address, etc.) of the API declaration file 222. In some embodiments, the code generation module 212 of the SOF module 132 may generate programming code to implement a public interface for the particular API according to the programming language and the software architecture used by the SOF module 132.

For example, the code generation module 212 may generate programming code that includes a programming structure for implementing the particular API, without the computer programming logic for the particular API. The programming code may specify the name and the input parameters for an API call corresponding to the particular API. The programming code may include an error handling section for handling errors when executing the particular API. The programming code may also include the location of the API declaration file 222 such that when the programming code is executed at runtime, the API declaration file 222 may be accessed and parsed to determine the computer programming logic for the particular API. In some embodiments, the programming code may include function calls to services provided by other components of the SOF module 132, such as the framework manager 202, the parsing module 204, the validation module 206, the service invocation module 208, and the response generation module 210. Thus, when the programming code associated with the API interface is executed, the components of the SOF module 132 may be triggered to perform functionalities associated with performing a computer processing logic for the API, as discussed in more detail below.

The declarative statements in the API declaration file 222 may also include a second declarative statement related to an access level required of a client device that initiated the API call. Based on the second declarative statement, when the framework manager 202 receives an API call corresponding to the particular API initiated by a client device (e.g., the user device 110), the framework manager 202 may determine an access level associated with the user device 110. If the access level associated with the user device 110 does not match the required access level, the framework manager 202 may return an error (e.g., throw an exception) as a response to the API call.

The declarative statements in the API declaration file 222 may also include a third declarative statement related to handling and verifying of input parameters included in the API call. As discussed herein, the first declarative statement of the API declaration file 222, which may be transformed into a public interface for the particular API, specifies a set of input parameters for a corresponding API call. For example, the first declarative statement may specify that the API call should include three parameters, including an integer, followed by another integer, and followed by a floating number. While the first declarative statement specifies the data types for the input parameters, which can be used to generate the programming structure for the public interface, it does not specify any additional rules and requirements for the input parameters. The third declarative statement of the API declaration file 222 specifies additional rules for the input parameters. For example, if the first input parameter corresponds to an account identifier of an account with the service provider server 130 and account identifiers with the service provider server 130 are four-digit numbers, the third declarative statement may include a rule that the first parameter must be a four-digit number.

Based on the third declarative statement, when the framework manager 202 receives, at runtime, an API call that includes a first parameter value, the framework manager 202 may determine whether the first parameter value included in the API call complies with the requirement set forth in the third declarative statement. If it is determined that the first parameter value complies with the requirement set forth in the third declarative statement, the framework manager 202 may proceed with processing the API call. On the other hand, if it is determined that the first parameter value does not comply with the requirement set forth in the third declarative statement, the framework manager 202 may return an error (e.g., throw an exception) as a response to the API call.

The declarative statements in the API declaration file 222 may also include a fourth declarative statement related to generating a response for the API call. In some embodiments, the fourth declarative statement may include key-value pairs that specify one or more services to be performed in order to generate a response for the API call. The one or more services may include a pre-existing service developed by another agent of the service provider server 130 or a third-party. The pre-existing service may be invoked via an API call corresponding to the service. Thus, the key-value pairs included in the fourth declarative statement may indicate the API call. The one or more services may also include a custom program developed by the agent who implements the particular API. While it is not required for the agent to use any programing code to implement the particular API, the agent may optionally develop a custom program that can be used by the particular API. The custom program may be developed using one or more programming languages (e.g., Java, Python, C++, etc.), and may specify an interface (e.g., a name, etc.) for the particular API to refer to in the fourth declarative statement. Based on the fourth declarative statement, when the framework manager 202 processes an API call corresponding to the particular API at runtime, the framework manager 202 may be configured to make one or more API calls corresponding to the one or more services requested in the fourth declarative statement.

In some embodiments, before the SOF module 132 is compiled and built (e.g., in response to a user command, etc.), the code generation module 212 may access one or more API declaration files. For example, the code generation module 212 may search for API declaration files stored in designated locations (e.g., within a particular folder within a data storage such as the data storage 260). The code generation module 212 may parse the first declarative statement in each of the API declaration files, and may generate programming code corresponding to public interfaces for the corresponding APIs. The programming code generated for each API may include a programming structure required for the public interface, which may include a name for an API call corresponding to the API, specifications for a set of input parameters (e.g., parameter data types, etc.) for the corresponding API, a data type for a response to the API call, a file location of the corresponding API declaration file (e.g., a network path, a folder location, etc.), and error handling for the API (e.g., a default response to an API call when an error occurs while processing the API call). In some embodiments, the programming code may also include function calls to services associated with the other components of the SOF module 132, such as the framework manager 202, the parsing module 204, the validation module 206, the service invocation module 208, and the response generation module 210 to execute the API based on the declarative statements included in the API declaration file. The generated programming code may be incorporated into the SOF module 132 in some embodiments.

After generating the programming code for the APIs based on the first declarative statements in the corresponding API declaration files, at least a portion (e.g., some components such as the framework manager 202, the parsing module, 204, the validation module 206, the service invocation module 208, and the response generation module 210, etc.) of the SOF module 132 along with the programming code generated for the APIs are compiled into executable code and deployed at a machine (e.g., the service provider server 130). In some embodiments where the APIs are implemented using interpreted programming languages, the APIs may be interpreted and converted into machine code during runtime. The framework manager 202 may receive an API call. For example, the user 140 may interact, via the user interface application 112 of the user device 110, with a user interface page (e.g., a webpage, a mobile application page, etc.) hosted by the interface server 134. During the interaction, the user 140 may initiate an action (e.g., by selecting a user interface element such as a button on the user interface page). Based on the initiation of the action, the user interface page executing on the user device 110 may make an API call, which may be received by the framework manager 202. In response to receiving the API call, the framework manager 202 may be configured to retrieve the API declaration file for the corresponding API based on the file name and the location path specified in the public interface implemented by the code generation module 212.

For example, the framework manager 202 may determine that the API declaration file 224 corresponds to the API call received from the webpage. The framework manager 202 may then use the parsing module 204 to parse the API declaration file 224. The parsing module 204 may first parse the second declarative statement in the API declaration file 224 related to an access level required of a client device that initiated the API call. Thus, the framework manager 202 may determine an access level associated with the user device 110 through the webpage. If the access level associated with the user device does not comply with the required access level based on the second declarative statement in the API declaration file, the framework manager 202 may return an error (e.g., throw an exception) as a response to the API call to the webpage.

On the other hand, if the access level associated with the user device complies with the required access level based on the second declarative statement in the API declaration file, the framework manager 202 may continue to process the API call. For example, the framework module 202 may use the parsing module 204 to parse the third declarative statement in the API declaration file that is related to handling and verifying of input parameters included in the API call.

As discussed herein, the third declarative statement may include one or more key-value pairs that specify rules for the input parameters. For example, if an input parameter corresponds to a credit card number, the rules may include a restriction that the input parameter value has to include fifteen or sixteen digits. In another example, if the input parameter corresponds to a social security number, the rules may include a restriction that the input parameter value has to include nine digits. The rules may also include a specific pattern, such as a pattern that includes two digits followed by one alphabetic letter, and then followed by another two digits. Based on the third declarative statement, the framework manager 202 may use the validation module 206 to determine whether all of the input parameter values included in the API call satisfy the rules specified in the third declarative statement.

If any input parameter value included in the API call does not satisfy the rules (e.g., a 5-digit account identifier instead of a 4-digit account identifier, etc.), the framework manager 202 may return an error (e.g., throw an exception) as a response to the API call to the webpage. On the other hand, if all of the input parameter values included in the API call satisfy the rules, the framework manager 202 may continue to process the API call. For example, the framework manager 202 may use the parsing module 204 to parse the fourth declarative statement in the API declaration file that is related to generating a response for the API call. As discussed herein, the fourth declaration statement may include one or more key-value pairs that specify one or more services to be invoked to process the API call and response data for the API call. The one or more services may include pre-existing services developed by others that form the building blocks for more complex services implemented by this particular API or other APIs. The one or more services may also include custom program developed by the agent who implements this particular API.

In some embodiments, the service invocation module 208 may identify all of the services specified in the fourth declarative statement in the API declaration file. The service invocation module 208 may then determine a service invocation hierarchy for invoking the services based on dependencies of the services. For example, if the service invocation module 208 determines that a first service depends on a second service (e.g., an input required for the first service is determined based on an output of the second service, etc.), the service invocation module 208 may determine a sequential arrangement for invoking the second service and the first service (e.g., invoking the second service first, and then invoking the first service based on an output from the second service). On the other hand, if the service invocation module 208 determines that a third service is not dependent on any other service, the service invocation module 208 may determine a parallel arrangement for invoking the third service along with one or more other services (e.g., the second service, etc.).

After determining the service invocation hierarchy, the service invocation module 208 may begin invoking the one or more services specified in the fourth declarative statement according to the service invocation hierarchy. In some embodiments, the service invocation module 208 may invoke at least one of the services based on one or more of the input parameter values included in the API call. The one or more services may include retrieving data from a data storage (e.g., retrieving a transaction history based on an account identifier, etc.). The one or more services may include performing a prediction using a machine learning model (e.g., assessing a risk of a transaction based on data associated with the transaction, etc.). The invocation of the one or more services may include making one or more API calls corresponding to the one or more services. Based on the invocation of the services in an order according to the service invocation hierarchy, the service invocation module 208 may receive output data from the services. In some embodiments, the response generation module 210 may generate data as a response to the API call based on the output data from the services. The data generated by the response generation module 210 may include a value (e.g., a risk score), a pointer to a file (e.g., a pointer to a network location that stores the transaction history of an account, etc.), or other data according to the response data type specified in the fourth declarative statement. The framework manager 202 may then transmit the data generated by the response generation module 210 to the webpage as a response to the API call.

Figure 3:
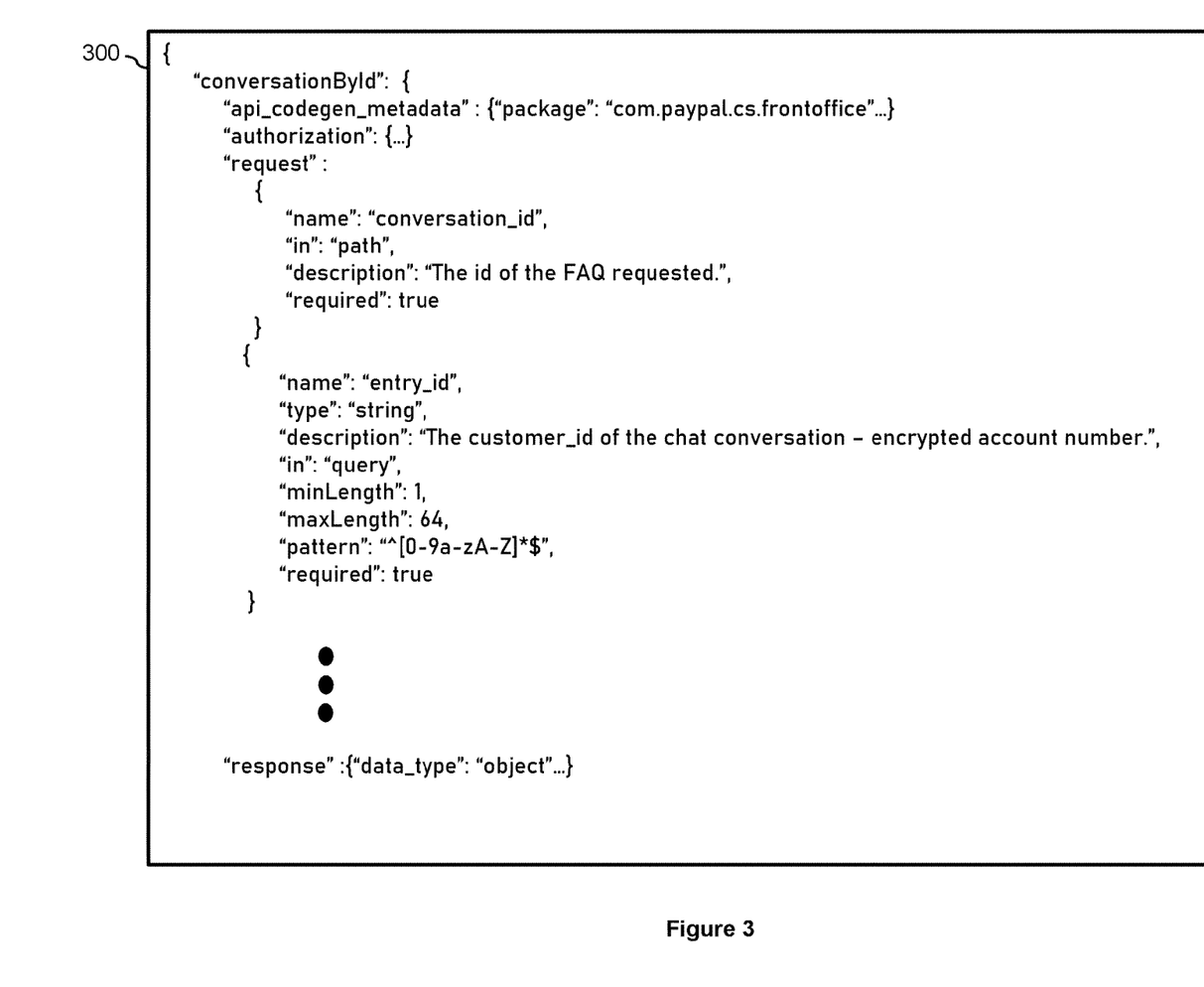
FIGS. 3 and 4 illustrate an example API declaration file according to an embodiment of the present disclosure.

FIG. 3 illustrates an example API declaration file 300 according to one embodiment of the disclosure. In some embodiments, the API declaration files 222 and 224 may follow the same format as the API declaration file 300. The API declaration file 300 begins with a name of the corresponding API. In this example, the name of the corresponding API is "coversationById" as shown in the first line of the API declaration file 300. The API declaration file 300 also includes four declarative statements, including an "api_codegen_metadata" declarative statement, an "authorization" declarative statement, a "request" declarative statement, and a "response" declarative statement. The "api_codegen_metadata" declarative statement includes key-value pairs that specify a format of the public interface corresponding to the API, such as the name, input parameters, and an output value type associated with the API call.

The "authorization" declarative statement specifies access levels required of a client device that initiates the API call. The "request" declarative statement specifies the rules for the input parameters. In this example, the "request" declarative statement includes rules for at least two input parameters "conversation_id" and "entry_id." As shown, the "request" declarative statement includes multiple key-value pairs that specify attributes for the input parameters, including the names of the input parameters, whether the input parameters are required or optional, and specific rules regarding the input parameters. For example, the "request" declarative statement includes rules, for the "entry_id" input parameter, such as a minimum length of 1, a maximum length of 64, a required alphanumeric arrangement for the value, etc. The "response" declarative statement specifies a manner for generating a response for an API call.

Figure 4:
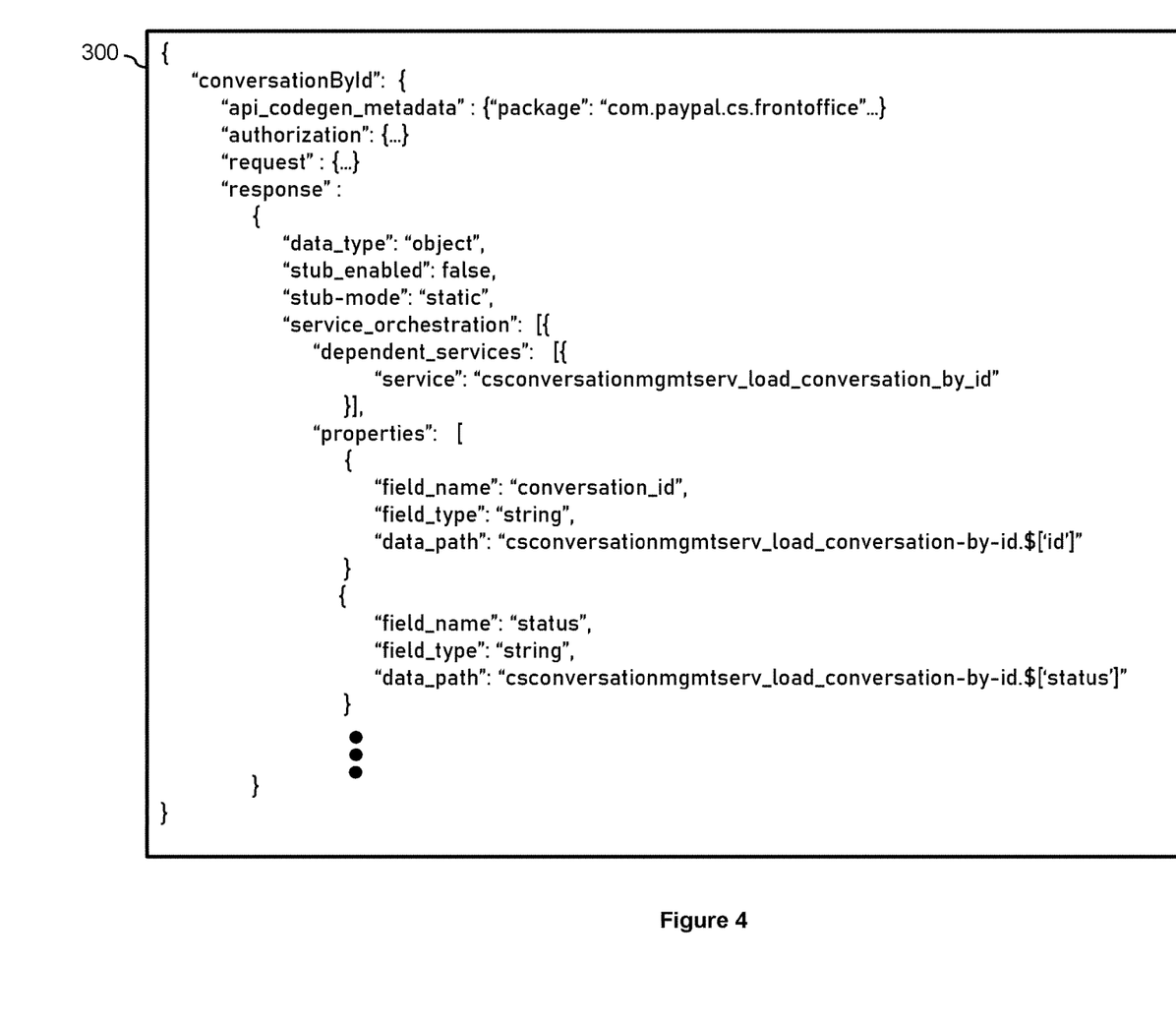

FIG. 4 illustrates the "response" declarative statement in the API declaration file 300 in more details. As shown in FIG. 4, the "response" declarative statement may specify a list of services to be invoked when the API call is made. As discussed herein, the "response" declarative statement may specify multiple services to be invoked. In some embodiments, when the service invocation module 208 identifies the services based on parsing the API declaration statement while processing a corresponding API call, the service invocation module 208 may determine a service invocation hierarchy for invocating the identified services.

Figure 5:
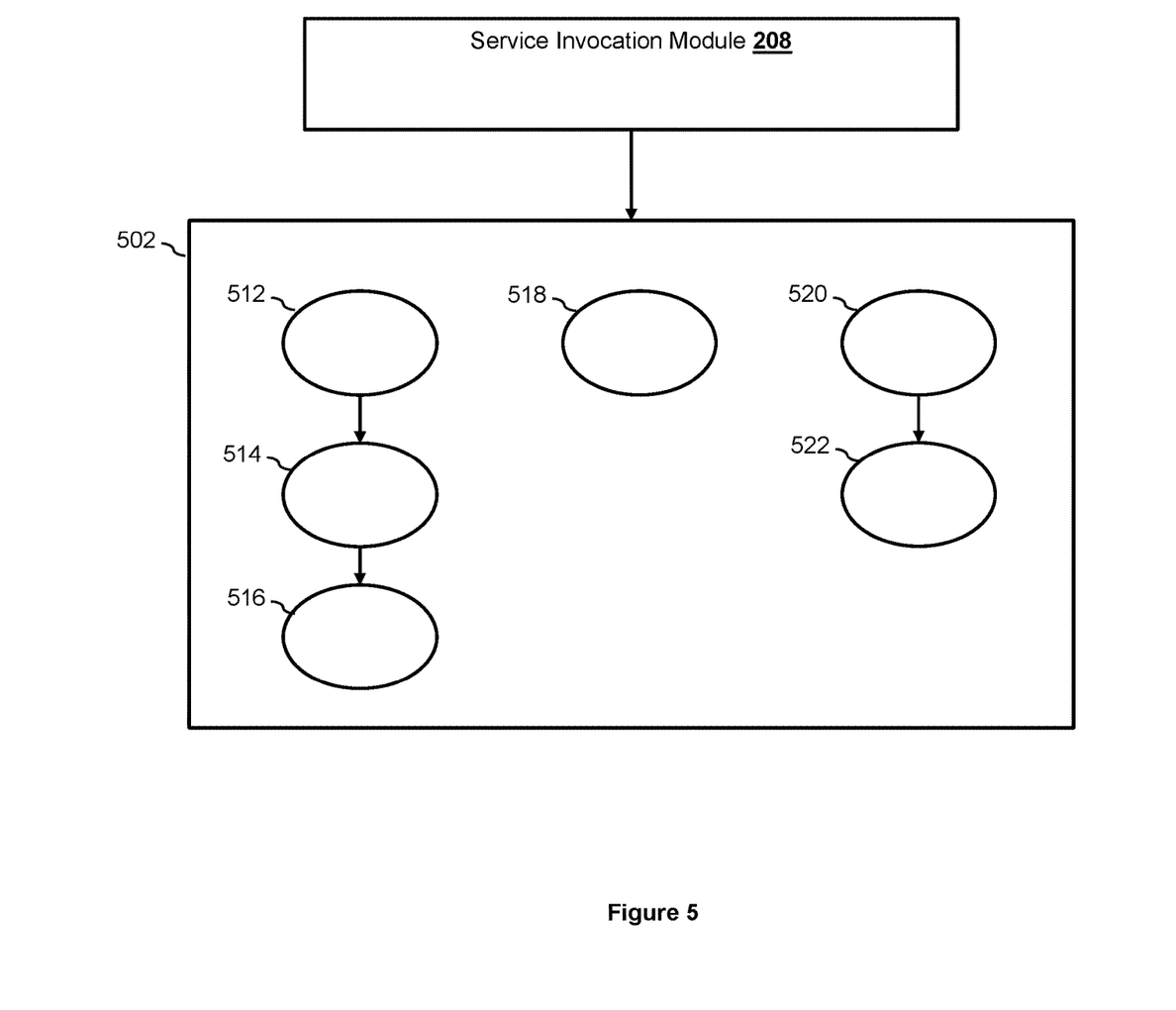
FIG. 5 illustrates an example service invocation hierarchy according to an embodiment of the present disclosure.

FIG. 5 illustrates an example service invocation hierarchy 502 determined by the service invocation module 208 based on six identified services 512, 514, 516, 518, 520, and 522 for an API. In this example, the service invocation module 208 may determine that the service 516 depends on the service 514, which in turn depends on the service 512. The service invocation module 208 may also determine that the service 522 depends on the service 520. Thus, the service invocation module 208 may determine that the services 512, 514, and 516 have to be performed in a sequential order (e.g., invoking the service 514 only after the service 512 is completed, and invoking the service 516 only after the service 514 is completed), and that the services 520 and 522 also have to be performed in a sequential order. However, the service invocation module 208 may determine that the services 512, 518, and 520 may be performed in parallel since they do not depend on each other. The service invocation module 208 may then invoke the services 512, 514, 516, 518, 520, and 522 according to the service invocation hierarchy 502.

Figure 6:
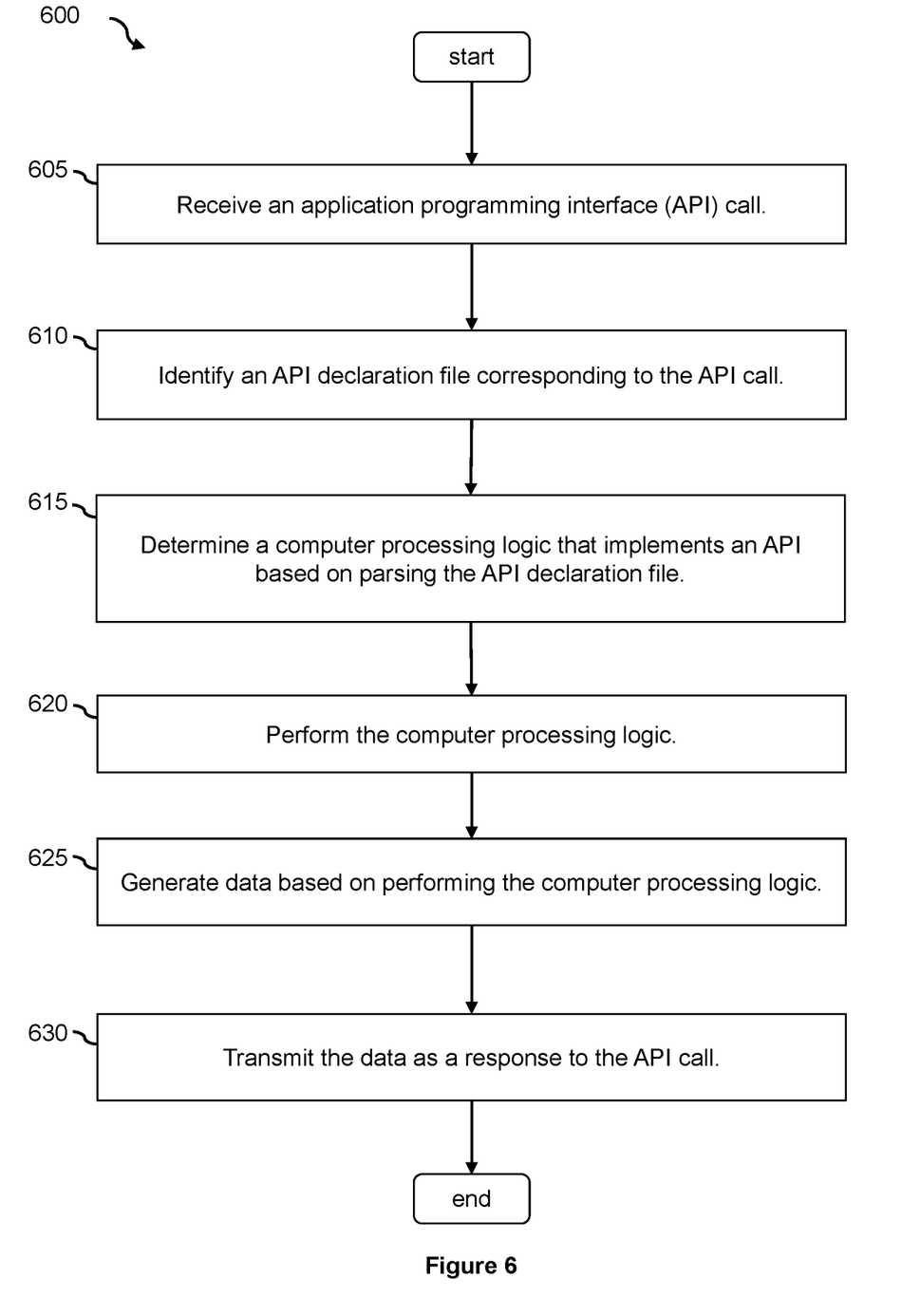
FIG. 6 is a flowchart showing a process of executing an API according to an embodiment of the present disclosure.

FIG. 6 illustrates a process 600 for facilitating application programming interface (API) calls according to various embodiments of the disclosure. In some embodiments, at least a portion of the process 600 may be performed by the SOF module 132. The process 600 may begin by receiving (at step 605) an application programming interface (API) call. For example, the user 140, through interacting with a user interface (e.g., a webpage, a mobile application page, etc.) hosted by the service provider server via the user device 110, may initiate an action which corresponds to an API call. Upon receiving the action, the user interface may make an API call to be received by the SOF module 132.

The process 600 then identifies (at step 610) an API declaration file corresponding to the API call. For example, the framework manager may execute the programming code generated by the code generation module 212 for a public interface corresponding to the API call. The programming code includes a file name and a location path of a corresponding API declaration file (e.g., the API declaration file 222). The framework manager 202 may then access the API declaration file based on the location path and the file name.

The process 600 determines (at step 615) a computer processing logic that implements the API based on parsing the API declaration file and performs (at step 620) the computer processing logic. For example, based on the third declarative statement (e.g., the "request" declarative statement) within the API declaration file, the framework manager 202 may determine a computer processing logic for validating input parameter values included in the API calls. The framework manager 202 may then validate the input parameter values included in the API call based on the rules specified in the third declarative statement.

Furthermore, based on the fourth declarative statement (e.g., the "response" declarative statement), the service invocation module 208 may determine services to be performed for the API and an order arrangement for performing the services. In some embodiments, the service invocation module 208 may determine a service invocation hierarchy that specifies an order for invoking and performing the services. The service invocation module 208 may then invoke or otherwise perform the services according to the order specified in the service invocation hierarchy.

The process 600 then generates (at step 625) data based on performing the computer processing logic and transmits (at step 630) the data as a response to the API call. For example, based on performing the services, the service invocation module may obtain output data from the services. The framework manager 202 may package the output data from the services as a data packet, and may transmit the data packet to the user interface (e.g., the webpage, the mobile application page, etc.) as a response to the API call, such that the user interface may present the output data and/or use the output data for further processing the action for the user 140.

Figure 7:
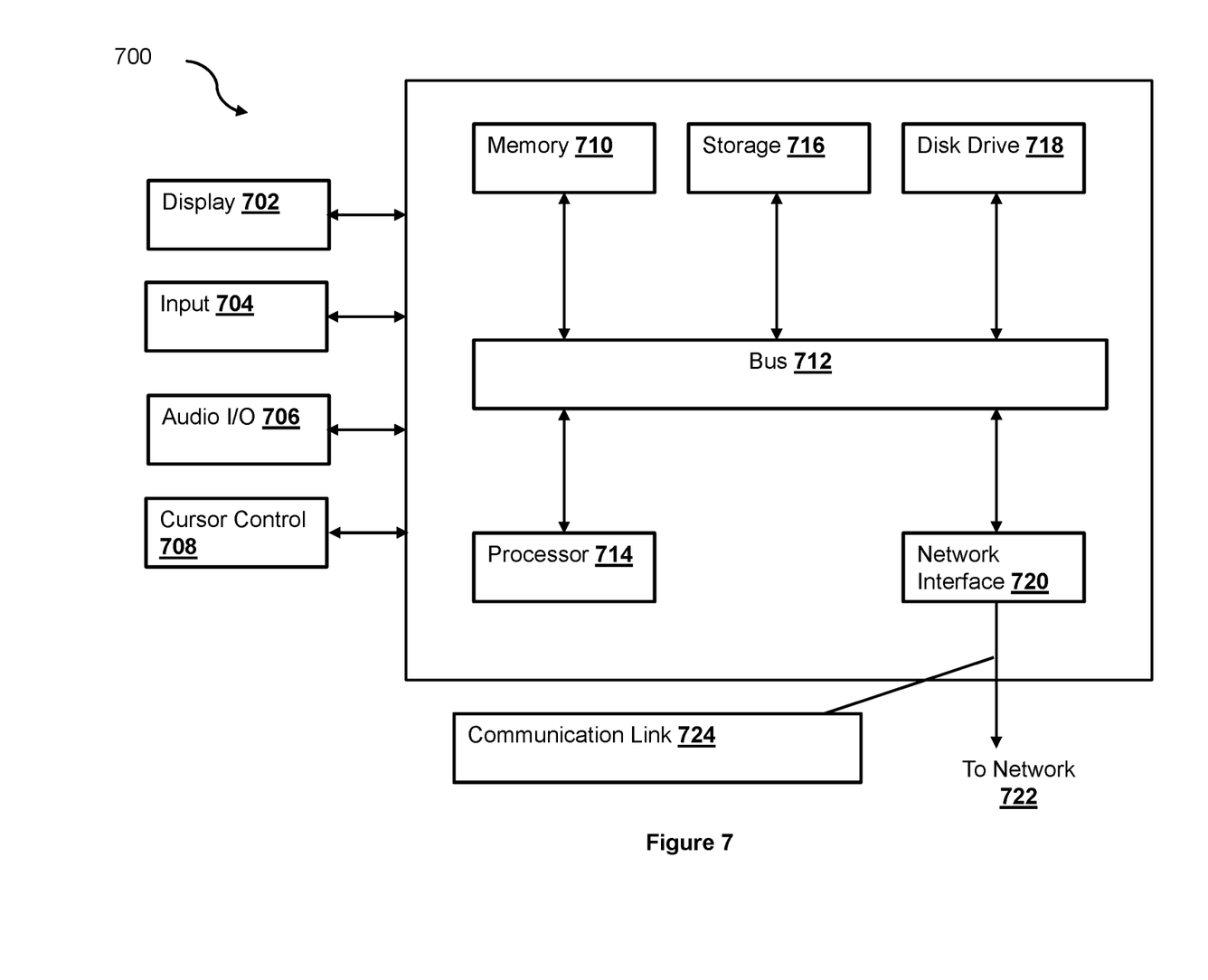
FIG. 7 is a block diagram of a system for implementing a device according to an embodiment of the present disclosure.

FIG. 7 is a block diagram of a computer system 700 for implementing a device according to an embodiment of the present disclosure that may be used to perform one or more of the functions or operations described herein. The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account or a checkout page for purchasing an item from a merchant. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via a network 722, such as network 160 of FIG. 1. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid-state drive, a hard drive). The computer system 700 performs specific operations by the processor 714 and other components by executing one or more sequences of instructions contained in the system memory component 710. For example, the processor 714 can perform the API functionalities described herein according to the process 600.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
   a non-transitory memory; and
   one or more hardware processors coupled with the non-transitory memory and configured to read instructions from the non-transitory memory to cause the system to perform operations comprising:
   receiving, by a software orchestration framework and from a software application, an application programming interface (API) call corresponding to an API function;
   identifying, from a plurality of API declaration files, a particular API declaration file that corresponds to the API function, wherein the particular API declaration file comprises declarative statements and lacks computer processing logic that implements the API function;
   determining, by the software orchestration framework, the computer processing logic that implements a set of services associated with the API function based on the declarative statements;
   performing, by the software orchestration framework, the computer processing logic, wherein the performing the computer processing logic comprises executing a set of functions corresponding to the set of services;
   generating, by the software orchestration framework for the API call, data based on the performing the computer processing logic; and
   transmitting, by the software orchestration framework, the data to the software application as a response to the API call.

2. The system of claim 1, wherein the performing the computer processing logic further comprises:
   determining a set of input data validation rules based on the declarative statements; and
   determining whether to validate one or more input values included in the API call based on the set of input data validation rules.

3. The system of claim 2, wherein the operations further comprise:
   determining that at least one input value from the API call fails to be validated based on the set of input data validation rules; and
   transmitting an error response to the software application.

4. The system of claim 1, wherein the performing the computer processing logic further comprises executing custom programming code specified in the declarative statements.

5. The system of claim 1, wherein the performing the computer processing logic further comprises:
   determining a software invocation hierarchy based on dependencies associated with the set of functions, wherein the executing the set of functions is based on the software invocation hierarchy.

6. The system of claim 5, wherein the software invocation hierarchy specifies a sequential execution of a first function and a second function within the set of functions.

7. The system of claim 5, wherein the software invocation hierarchy specifies a parallel execution of a third function and a fourth function within the set of functions.

8. The system of claim 1, wherein the software application is associated with a web server, and wherein the API call is initiated based on a user interaction with a webpage hosted by the web server.

9. A method, comprising:
   receiving, by one or more hardware processors associated with a software orchestration framework, a first application programming interface (API) call corresponding to an API from a first software application;
   accessing, by the one or more hardware processors, a particular API declaration file that corresponds to the API, wherein the particular API declaration file comprises first declarative statements and lacks first computer processing logic that implements the API;
   determining, by the one or more hardware processors, the first computer processing logic that implements the API based on the declarative statements;
   generating, by the one or more hardware processors for the first API call, response data based on performing the first computer processing logic;
   transmitting, by the one or more hardware processors, the response data to the first software application as a response to the API call;
   in response to receiving a second API call corresponding to the API from a second software application, accessing an updated API declaration file corresponding to the API, wherein the updated API declaration file is generated based on updating the particular API declaration file;

determining second computer processing logic that implements the API based on second declarative statements in the updated API declaration file, wherein the second computer processing logic is different from the first computer processing logic; and performing the second computer processing logic for the second API call.

10. The method of claim 9, wherein the first computer processing logic is performed in a non-blocking manner.

11. The method of claim 9, wherein the first software application is associated with a web server, and wherein the first API call is initiated based on a user interaction with a webpage hosted by the web server.

12. The method of claim 9, wherein the performing the first computer processing logic comprises:

determining a set of input data validation rules based on the first declarative statements; and determining whether to validate one or more input values included in the first API call based on the set of input data validation rules.

13. The method of claim 12, further comprising:

determining that at least one input value from the first API call fails to be validated based on the set of input data validation rules; and transmitting an error response to the first software application.

14. The method of claim 9, wherein the first computer processing logic corresponds to a set of functions, and wherein the performing the first computer processing logic comprises:

determining a software invocation hierarchy based on dependencies associated with the set of functions; and executing the set of functions based on the software invocation hierarchy.

15. A non-transitory machine-readable medium having stored thereon machine-readable instructions executable to cause a machine to perform operations comprising:

receiving, by a software orchestration framework and from a software application, an application programming interface (API) call corresponding to an API function;

identifying, from a plurality of API declaration files, a particular API declaration file that corresponds to the API function, wherein the particular API declaration file comprises declarative statements and lacks computer processing logic that implements the API function;

determining, by the software orchestration framework, the computer processing logic that implements the API function based on the declarative statements;

performing, by the software orchestration framework, the computer processing logic, wherein the performing the computer processing logic comprises executing a custom function specified in the declarative statements;

generating, by the software orchestration framework for the API call, data based on the performing the computing processing logic; and transmitting, by the software orchestration framework, the data to the software application as a response to the API call.

16. The non-transitory machine-readable medium of claim 15, wherein the operations further comprise:

generating programming code for the API function based on the declarative statements in the particular API declaration file;

incorporating the programming code into the software orchestration framework; and compiling software code comprising the programming code generated for the API function.

17. The non-transitory machine-readable medium of claim 15, wherein the performing the computer processing logic further comprises:

determining a set of services to be performed for the API function based on the declarative statements; and executing a set of functions within the software orchestration framework based on the set of services.

18. The non-transitory machine-readable medium of claim 17, wherein the performing the computer processing logic further comprises:

determining a software invocation hierarchy based on dependencies associated with the set of functions, wherein the executing the set of functions is based on the software invocation hierarchy.

19. The non-transitory machine-readable medium of claim 18, wherein the software invocation hierarchy specifies a sequential execution of a first function and a second function within the set of functions.

20. The non-transitory machine-readable medium of claim 18, wherein the software invocation hierarchy specifies a parallel execution of a third function and a fourth function within the set of functions.

* * * * *